United States Patent [19]
Fayard et al.

[11] 3,886,306
[45] May 27, 1975

[54] SIGHTING APPARATUS FOR HELICOPTERS

[75] Inventors: Andre Fayard; Jean-Pierre Couturier, both of Paris, France

[73] Assignee: Thomson-CSF, Paris, France

[22] Filed: Aug. 17, 1973

[21] Appl. No.: 389,312

[30] Foreign Application Priority Data
Aug. 17, 1972 France .......................... 72.29473
Nov. 17, 1972 France .......................... 72.40898

[52] U.S. Cl. ......... 178/6.8; 178/DIG. 20; 244/1 SD
[51] Int. Cl. ...................... H04n 7/18; B64d 43/00
[58] Field of Search ......... 178/6.8, DIG. 1, DIG. 20, 178/DIG. 6; 244/1 SD

[56] References Cited
UNITED STATES PATENTS
3,521,228  7/1970  Congleton .................. 178/DIG. 20
3,721,499  3/1973  Narbaits-Jaureguy ....... 178/DIG. 20
3,742,812  7/1973  Woodworth ................. 178/DIG. 20

*Primary Examiner*—Howard W. Britton
*Attorney, Agent, or Firm*—Edwin E. Greigg

[57] ABSTRACT

What follows is a description of a sighting apparatus for helicopters. The apparatus comprises a closed circuit television system including a receiver, a camera and a structure for mounting the camera to the lower portion of the helicopter fuselage so that an image of a zone located in the vicinity of the helicopter can be furnished on a screen of the receiver. A circuit is provided for superimposing on the screen a first moving straight line reference mark whose position is a function of the pitch angle of the helicopter and a second moving straight line reference mark whose position is a function of the roll angle of the helicopter.

6 Claims, 5 Drawing Figures

SIGHTING APPARATUS FOR HELICOPTERS

BACKGROUND OF THE INVENTION

The present invention relates to a sighting apparatus for helicopters and in particular to such an apparatus intended to facilitate maneuvers during stationary helicopter flight (hovering) in the case of crane operations (that is to say, operations during which the helicopter must deposit a load at a precise location for example) or aircraft carrier landing operations.

To this end, it is possible to equip a helicopter with a closed-circuit television comprising a camera fixed underneath the helicopter in such a way that it forms an image on the receiver of that part of the ground (or of the sea) which is located under the helicopter and which is hidden from the view of the pilot. Still, such a simple television image is an incomplete indication for the pilot whenever he must proceed to conduct a crane operation involving some precision. In fact, because of the permanent attitude changes which occur particularly in a gusty atmosphere. In this type of situation the pilot needs reference points in order to be able to maintain the helicopter in stationary flight (hovering). The televised image does not supply such essential indications because it provides a plane image and because the apparent displacements of the image are both those of the helicopter with respect to the ground as well as the variations of inclination of the camera due to the attitude changes in the helicopter. Furthermore, when the required precision is taken into account in the case of a crane operation and also the totality of the proper reaction times of the pilot and of the helicopter, then the indications of attitude variation furnished by known-type on-board instruments have proved insufficient to permit the pilot to work with the required precision (the attitude indicators of the type known as "artificial horizon" are not instruments conceived to serve to maintain a helicopter in rigorous hovering flight). These inconveniences are accentuated furthermore when the maneuver to be effected does not take place in the immediate vicinity of the ground, but rather at the top of some construction, for example, when the pilot has at his disposal no external reference means whatever for judging the location by reference with the ground or with respect to obstacles or to judge the position of the helicopter in the air.

OBJECTS AND SUMMARY OF THE INVENTION

It is, therefore, a general object of the present invention to provide a sighting apparatus for helicopters which facilitates maneuvering to an extent heretofore not possible.

It is a more specific object of the present invention to provide a sighting apparatus for helicopters having a closed circuit television system including a receiver on whose screen there are reproduced reference marks which are a function of the pitch angle and roll angle of the helicopter, thereby assisting the pilot in performing operations such as crane operations and carrier landings with a high degree of accuracy.

These and other objects are accomplished according to a preferred aspect of the present invention by furnishing to the pilot a complex image which comprises, in super-position to an image of the zone lying in the field of view of the camera, luminous moving reference marks whose position with respect to fixed reference marks characterizes the attitude of the helicopter in roll and in pitch and which further comprises a numerical indication of altitude.

In what follows, "pitch angle" will designate the angle formed by the roll axis of the helicopter with a horizontal plane and we shall designate as "roll angle" the angle formed by the pitch axis of the helicopter with a horizontal plane. In cases where the helicopter is affected solely by pitch, the pitch angle measures the attitude change of the helicopter around its pitch axis and when the helicopter is affected solely by roll, the roll angle measures the inclination of the helicopter around its roll axis.

According to one preferred embodiment of the present invention, a sighting apparatus for helicopters is characterized in that it comprises a closed circuit television system including a receiver, a camera and means for mounting the camera to the lower portion of the helicopter fuselage in such a manner as to furnish on the screen of the receiver an image of a zone located in the vicinity of the helicopter. The system further includes means for forming on the image produced on the screen of the receiver a moving reference mark whose position is a function of the pitch angle of the helicopter.

DESCRIPTION OF THE PREFERRED EMBODIMENTS

Figure 1:
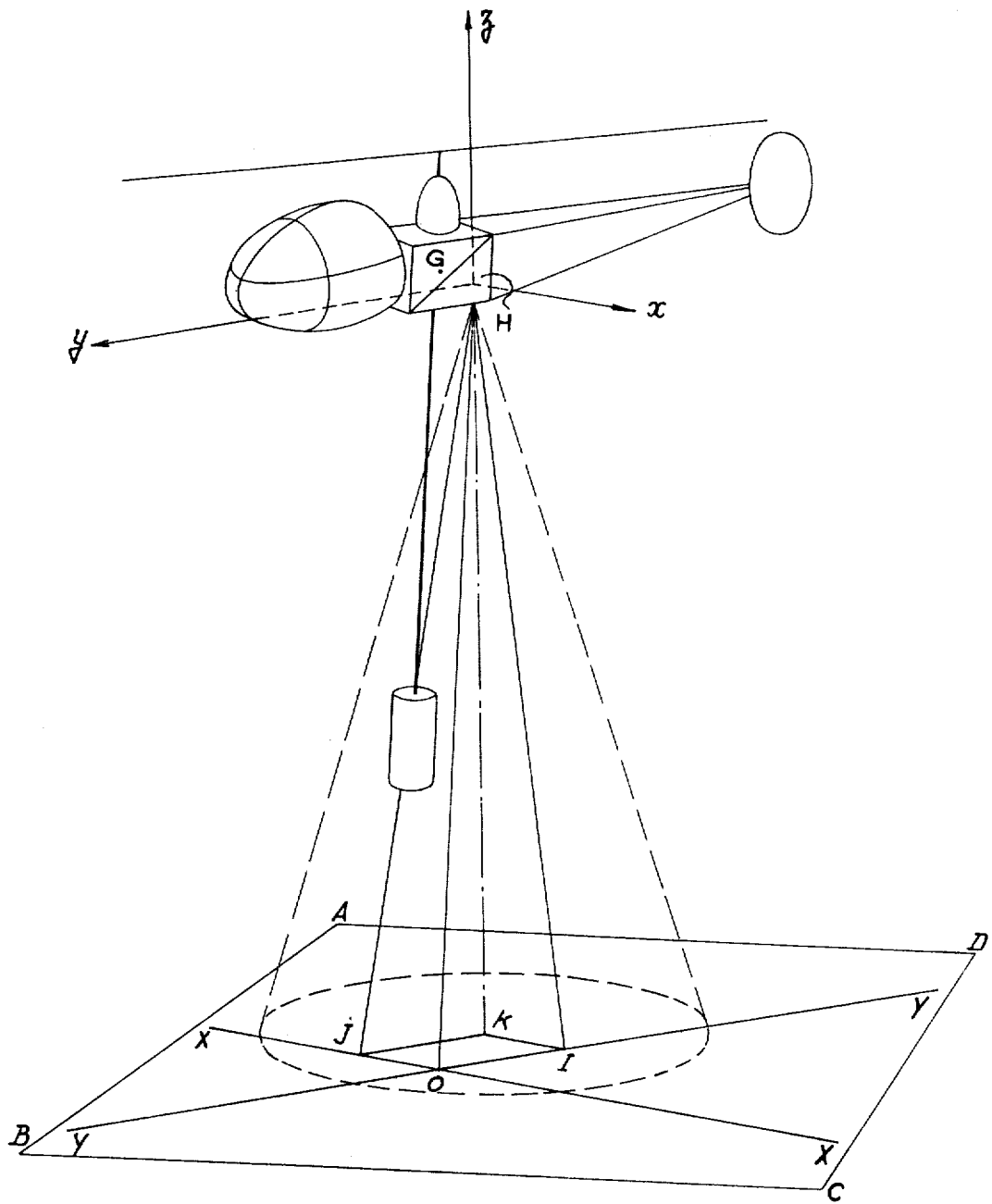
FIG. 1 is a schematic view in perspective of a helicopter in hovering flight and of the coordinate system established for use with the television system on board the helicopter.

Turning now to FIG. 1 there is shown a helicopter in flight, from which there is suspended a load placed at the end of a sling. This load is suspended in the manner of pendulum along a vertical line passing through the attachment point of the sling. The attachment points lies in an extension of the rotor axis and in the vicinity of the center of gravity G of the helicopter. A television camera is disposed at the lower part of the fuselage of the helicopter at a point H. Accordng to one exemplary embodiment of the present invention, the camera is rigidly fixed but adjustable to the helicopter; in a second exemplary embodiment according to the present invention, the camera is carried in a mechanism that permits modifying its orientation.

The point H is preferably situated in the longitudinal plane of symmetry of the helicopter where this plane is defined by the longitudinal axis and by the rotor axis of the helicopter. Point H is displaced with respect to the attachment point of the sling in such a manner what the load suspended from the helicopter does not occupy too substantial a portion of the field of view of the camera, and thus, it does not mask the zone of interest on the ground and surrounding the point of deposition of the load. In FIG. 1 there is shown a rectangular coordinate system H$xyz$; with the axis H$x$ being parallel to the transverse direction of the helicopter along which the helicopter pitch axis is directed; the axis H$y$ being parallel to the longitudinal axis of the helicopter along which the helicopter roll axis is directed; and the axis H$z$ being parallel to the rotor axis along which the helicopter yaw axis is directed. ABCD represents a part of the ground, assumed flat, which extends under the helicopter with XX and YY being the vertical projections, respectively, at ground level of the axes H$x$ and H$y$. The straight lines XX and YY cross at a point O lying on the vertical line OH passing through the camera.

The camera is disposed in such a manner that it is substantially directed along the vertical axis when the helicopter is in stationary (hovering) flight, so that its field of view encompasses the load and the point on the ground where it is to be deposited. However, in order to obtain an image on the screen which is centered about the point of deposit on the ground, it can be advantageous to incline the camera in the longitudinal plane very slightly with respect to the vertical and in the direction of the load. In the same manner, it is suitable to modify in advance the orientation of the camera if the helicopter, while maintained in hovering flight, has to be inclined in order to compensate for the action of the wind. Since in perfect hovering flight the rotor axis of a helicopter is otherwise directed along the vertical axis or along an axis substantially in the direction of the vertical axis (because of its construction), the optical axis of the camera under those conditions is also always substantially directed along the direction of the axis of the rotor.

Since the camera is oriented along the axis H$z$, whenever the helicopter is in a roll or pitch condition, the optical axis of the camera intersects the ground at a point different from point O, that is, point K as is illustrated in FIG. 1. In FIG. 1 there is also represented in broken lines the field of view covered by the objective lens of the camera. On the ground, this field comprises a zone which is off-centred with respect to the point O situated on the vertical line HO. J and I represent the orthogoanl projections of the point K onto the straight lines XX and YY. The angle IHO located in the vertical plane passing through the straight line YY and the angle JHO located in the vertical plane passing through the straight line XX are respectively equal to the angles of pitch and roll.

The television camera takes a picture of that part of the ground which surrounds point K and that image is reproduced on the screen of a conventional television receiver placed in front of the pilot. The camera is coupled to the receiver in such a manner that the top of the screen corresponds to the image of the portion of the ground situated toward the front of the helicopter and the bottom of the screen refers to the image of that portion of the ground which is situated toward the rear of the helicopter. In order to give the pilot an indication of the attitude of the helicopter and of its variations, there are superimposed onto the image reference marks which move as a function of the pitch and roll angles.

In what follows, we shall designate as "line axis" that axis of the screen which is parallel to the line sweep direction of the screen and as "field axis" that axis of the screen which is perpendicular to the line sweep axis of the screen; the terms "line direction," and "field direction" are defined in analogous fashion.

Figure 2:
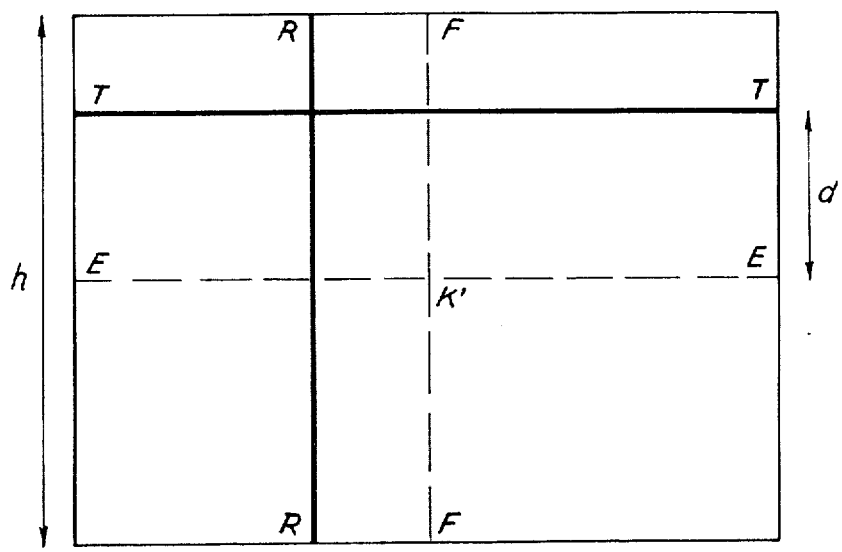
FIG. 2 is a plane view of the screen of a television receiver illustrating the fiducial axes and the movable axes of the television system according to the present invention.

FIG. 2 shows an image formed on the screen of the receiver; that image corresponds to the case illustrated in FIG. 1.

The images on the screen of the imaginary straight lines XX and YY located on the ground would be straight lines parallel to the axes of the screen with the image of the straight line XX being a straight line parallel to the line axis, and the image of the straight line YY being a straight line parallel to the field axis. In the preferred embodiment of the invention the roll reference mark and the pitch reference mark are parallel, respectively, to the images of the straight lines XX and YY and, thus, parallel to the axes of the screen. The roll reference mark and the pitch reference mark are situated at distances from these axes proportional, respectively, to the roll angle and the pitch angle. For zero angles of pitch and roll, the attitude reference marks coincide with the axes of the screen; that particular position is indicated by two fiducial lines EE and FF placed on the receiver. The fiducial lines EE and FF, although fixed, can, in certain particular cases, possibly be shifted for the duration of the flight.

The attitude references follow the apparent movements of the imaginary straight lines XX and YY on the ground, with the pitch reference mark being displaced toward the top of the screen, while remaining parallel to it, by a distance proportional to the pitch angle whenever the helicopter is in a nosedown (pitch) attitude, and displaced toward the bottom of the screen when the helicopter has a nose-up attitude; and in analogous fashion with the roll reference mark being displaced toward the right of the screen, while remaining parallel thereto, by a distance porportional to the roll angle whenever the helicopter executes a roll to the right, and being displaced toward the left when the helicopter executes a roll to the left. The result of this is that when the pilot changes the attitude of the helicopter by means of his control stick, the attitude reference marks follow the gestures of his hand.

In order to immobilize the helicopter vertically above some point, the pilot reacts to the signals in such a manner as to progressively bring the intersection of the moving reference marks into coincidence with the image of the target and thereafter to maintain it superimposed on the image of the target, that superposition taking place in the center of the screen whenever the angles of pitch and roll are zero.

It should be noted that since in general the longitudinal attitude variations would be accompanied by larger shifts in the position of the helicopter than those induced by variations of inclination (roll), the pitch reference would be, in and of itself, sufficiently useful as a pilot indicator.

Preferably, a numerical altitude indication of the helicopter above the level of the target is also given on the screen.

Figure 3:
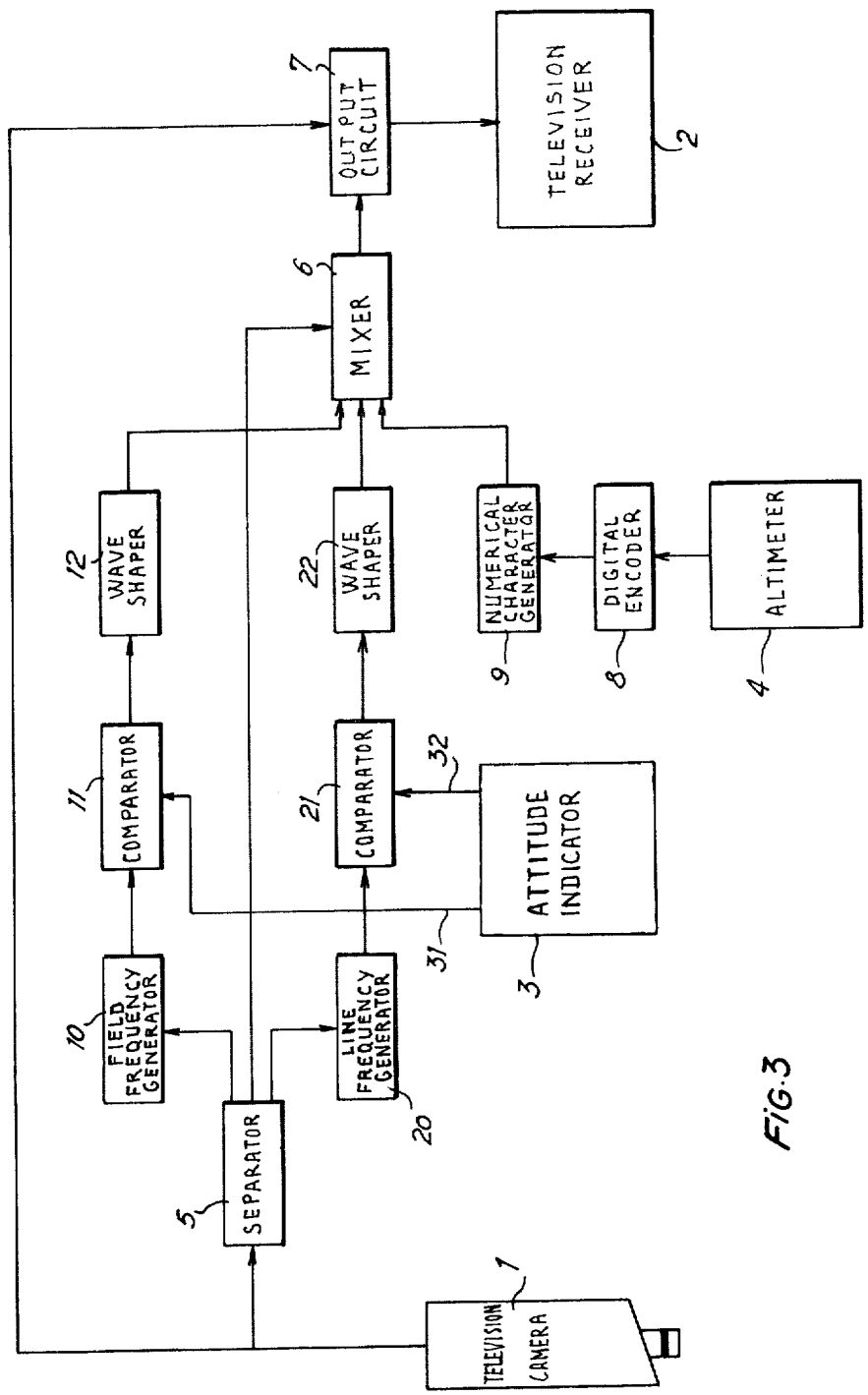
FIG. 3 is a schematic circuit diagram of a preferred embodiment of the television system according to the present invention.

The schematic diagram of FIG. 3 represents a preferred embodiment of the sighting apparatus according to the present invention.

The sighting apparatus comprises principally a television camera 1, a television receiver 2 and auxiliary electronic circuitry including an attitude indicating instrument (roll and pitch) 3 and an altimeter 4. The attitude indicator 3 used is a gyroscope which transmits an artificial horizon. Attitude indicators of this type generally have a gyroscope and potentiometers whose moving contact fingers have a position which is slaved to the angular position of the gyroscope in such a manner as to copy the roll angle and the pitch angle. The attitude indicator 3 has a first output 31 which furnishes a DC voltage (hereinafter pitch voltage) proportional, by a coefficient $b$, to the value of the pitch angle, and a second output 32 which furnishes a DC voltage (hereinafter roll voltage) proportional to the roll angle.

The attitude indication of the helicopter above the ground or obstacle is furnished by a distance measuring instrument fixed underneath the helicopter. The measurement instrument 4 is made up, for example, of a transceiver apparatus of a radiosonde type operating on radio frequencies with frequency modulation, which provides a measuring range limited to the order of some tens of meters. Such a measuring instrument furnishes at its output a DC voltage directly proportional to the measured height.

The video output of camera 1 provides a complete video signal. The output is connected, on the one hand, to the input of a separator 5 and, on the other hand, to an input of an output circuit 7.

The separator 5 extracts from the complete video signal the synchronization impulses at the field frequency, the synchronization impulses at the line sweep frequency and the blanking signals, these are thereafter transmitted respectively to the synchronization inputs of a generator 10, generating a sawtooth wave signal at the field frequency, a generator 20, generating a sawtooth wave signal at the line sweep frequency and to the auxiliary input of a mixer 6. The sawtooth signals produced by the generators 10 and 20 are symmetrical about zero.

The output of the generator 10 is connected to the first input of a comparator 11. The comparator 11 has a second input connected to the output 31 of the attitude indicator 3. The output of the comparator 11 is fed to a wave-shaping circuit 12. The comparator 11 compares the sawtooth signal from the generator 10 at field frequency with the DC voltage characteristic of the pitch angle and at that instant of a field period when the amplitude of the sawtooth signal attains the value of the DC pitch voltage, the comparing trips (changes state) and its output voltage changes in value. Beginning with this change of state, the wave-shaping circuit 12 furnishes at its output a pulse whose amplitude corresponds to the "white level" and whose duration is in the neighborhood of the duration of two lines of sweep. The pulse is fed to one input of the mixer 6 so that is may be introduced into the final video signal intended to supply the receiver 2. The described function is repeated during each field period. The comparator 11 returns to its initial state during the retrace period of the sawtooth signal. The totality of the pulses obtained at field frequency produces a white bar on the screen which is parallel to the line axis, whose height is in the neighborhood of four lines, and whose position along the field axis is a function of the pitch angle. Actually, the instant when the comparator 11 trips during a field period is a function of the pitch angle and that instant corresponds to a particular position of the spot on the screen. The respective polarities of the sawtooth signal at field frequency and of the pitch voltage are chosen in such a manner that, for positive angles of pitch (nose-down attitude of the helicopter), each pulse occurs during the first half of a field period and that the bar produced by these pulses is situated in the upper half of the screen.

In a similar manner, another comparator 21 is connected to the output 32 and to the generator 20. The comparator 21 compares the sawtooth signal at line sweep frequency to the roll voltage. A wave-shaping circuit 22, controlled by the flipping (state changing) of the comparator 21 furnishes during each line sweep period a short pulse whose amplitude corresponds to the "white" level.

The pulses at line sweep frequwncy are fed to the mixer 6 in order to be used in the final video signal. These pulses produce a white bar on the screen parallel to the field axis, whose position along the line axis is a function of the roll angle. In the same manner as for pitch signals, the relative polarities of the sawtooth signal at line sweep frequency and of the roll voltage are chosen in such a manner as to form each pulse during the second half of a line sweep period for a roll angle to the right, and in such a manner as to form each pulse during the first half of the line sweep period for a roll angle to the left in order to obtain a roll reference mark in the corresponding portion of the screen.

The distance $d$ (FIG. 2) which separates, on the screen, the pitch reference marks from the corresponding fiducial line is related to the value of the pitch angle by a coefficient of proportionality $q$. This coefficient has the form of a $q = (h/U) \, b$ where $h$ represents the usable height of the screen, $U$ represents the peak-to-peak amplitude of the sawtooth signal at field frequency and $b$ represents the proportionality constant relating the pitch voltage to the value of pitch angle.

In the preferred embodiment the signal generator 10 has a control element which permits the adjustment of the peak-to-peak amplitude $U$ of the sawtooth signal in order to select a particular value of the coefficient $q$. In the same way, the distance separating, on the screen, the roll reference mark from the corresponding fiducial line, is related to the value of the roll angle by a coefficient of proportionality $t$ and the signal generator 20 has a control element which permits the adjustment of the peak-to-peak amplitude of the sawtooth signal at line sweep frequency and thus to obtain a particular value of this coefficient $t$.

The coefficients $q$ and $t$ determine the scale at which the pilot sees on the screen the variations of attitude in roll and pitch. The adjustment controls permit the pilot to choose the scale corresponding in the best way to his own natural reactions as a pilot. In a quite general way, it is advantageous, in order to facilitate holding the aircraft in stationary hovering flight, to choose the coefficients $q$ and $t$ such that the displacements of the moving references appear to be amplified with respect to the visual exterior references and it is advantageous to choose the coefficient $q$ larger than the coefficient $t$.

In the particular case where the scale in degrees per centimeter of the roll and pitch reference marks is identical to the scale of the image, the roll and pitch reference marks are the images of the virtual straight lines XX and YY located on the ground and their point of intersection is the image of the vertical line passing through the camera. The displacements of the televised image, with respect to this point of intersection, are then a reproduction of the real displacements of the helicopter with respect to the ground, the image of this point being affected neither by altitude variations nor by attitude variations of the helicopter.

The altimeter 4 is connected to a digital encoding circuit 8, where the DC voltage corresponding to a particular measured height is coded in digital form and transmitted to a numerical character generator 9. This generator 9 is synchronized by the synchronization pulses at both field frequency and at line sweep frequency which it receives from the discriminator circuit 5 by a connection not shown in FIG. 3. In a known manner, the character generator 9 furnishes the electrical signals necessary for the formation on the screen of numerical indications corresponding to the coded information which it receives. These signals are transmitted to the input of the mixer 6.

Of course, the altitude indications can be given in simpler form, for example, by a luminous reference mark which moves with respect to a graduation permanently fixed at one of the vertical sides of the screens.

The mixer 6 mixes the signals corresponding to the roll reference, the pitch reference, and the altitude indication. Between the blanking intervals, the resulting mixed signal is transmitted to the output circuit 7. During the blanking intervals no signal whatsoever is transmitted to the output of the mixer.

The output circuit 7 forms the final video signal using the video signal of the camera and the complementary signal coming from the mixer 6.

As has been indicated above, in a second embodiment of the sighting apparatus according to the present invention, the camera is no longer directly fixed on the helicopter, but is carried by a mechanism which renders it movable. In effect, in the case of aircraft carrier landing maneuvers or of crane operations, it can be advantageous to use the sighting apparatus not only during the phase of hovering flight as such but also during the approach phase which precedes the maneuvers in hovering flight. In order to make the sighting apparatus convertible, it is sufficient to make the camera movable in the longitudinal plane of symmetry of the helicopter or in a plane parallel thereto in order to be able to move it sufficiently from the vertical position during the approach phase and so to obtain an image of a zone located toward the front of the helicopter.

Figure 4:
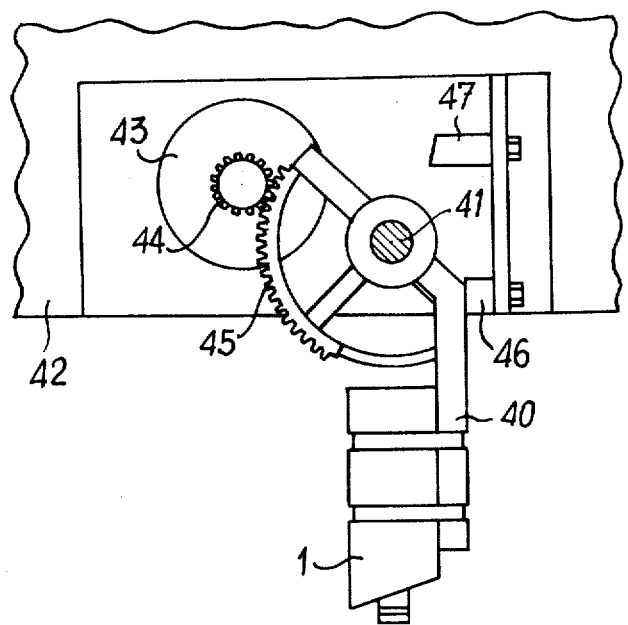
FIG. 4 is a schematic illustration of a television camera mounting structure according to one preferred embodiment of the present invention.

The orientation mechanism of the camera which is represented in FIG. 4 includes a support arm 40 to which the camera 1 is fixedly attached. The support arm 40 is rotatably mounted to an arbor 41 which in turn is fixedly connected to the helicopter 42 and has an axis parallel to the helicopter pitch axis. The orientation mechanism also includes a turning mechanism for the support arm 40 intended to turn it and to immobilize it in certain predetermined positions. The turning mechanism includes a motor 43 coupled to the support arm by two gears 44 and 45. Stops 46 and 47 are also provided for limiting the displacement of the support arm 40. One of the stops 46 corresponds to the position of the arm 40 for which the camera 1 is directed substantially parallel to the rotor axis, while the second stop 47 corresponds to a position of the arm 40 for which the camera 1 is oriented toward the front of the helicopter. In a preferred embodiment, In a preferred embodiment, a pair of switches are provided in the cockpit of the helicopter. These swithes form part of the electric circuit for controlling the motor 43. One switch is intended for starting the motor 43, and the other is intended to serve as a commutator to reverse the supply current in order to reverse the sense of rotation of the motor. These two switches can, if desired, be grouped in one. Simple electromechanical devices are disposed in the circuit for controlling the arrest of the motor 43 and the locking of the support arm 40 when the latter is rotated into one of the limiting positions determined by the stops. The locking devices release the support arm 40 when the starting switch of the motor is activated.

During the aircraft carrier deck landing maneuver, for example, the camera 1 is disposed obliquely during the approach phase and then brought into the vertical position during the landing phase.

As a result of this improvement the sighting apparatus permits the pilot to pass over from visual references to the televised reference marks at a distance sufficiently far away from possible obstacles so that there will be no difficulties. This improvement also permits aircraft carrier deck landings at night without direct visibility in the case where the television camera is equipped with a tube that is sensitive to very low illumination.

The camera 1 may also be mounted so that its orientation be independent of the attitude of the helicopter. Actually, for certain uses, particularly those which necessitate the employment of a camera having a restricted field of view, it is preferable to uncouple the movements of the camera from those of the helicopter in order to make the sighting axis perfectly vertical independently of instantaneous parasitic attitude variations of the helicopter.

Figure 5:
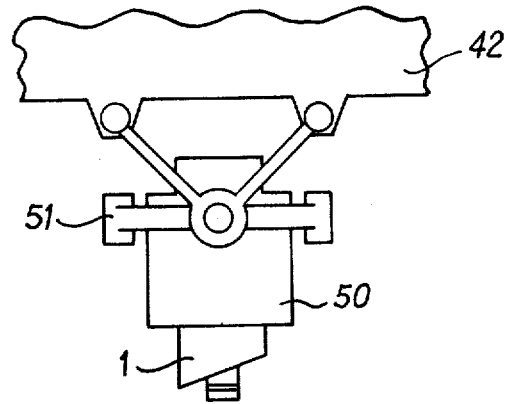
FIG. 5 is a schematic illustration of a television camera mounting structure according to another preferred embodiments of the present invention.

The mechanism shown in FIG. 5 corresponds to a simple embodiment in which the stabilization is obtained by the action of gravity. The camera 1 is fixed in a support 50 having considerable inertia. This support is suspended under the helicopter 42, for example, by means of a gimbal suspension 51.

Of course other arrangements may be desired, for example an arrangement using a gyroscope system and a servomechanism, with the possibility of making the latter inoperative when it is desired to control the orientation of the camera manually.

The present invention is not limited to the described embodiments. Particularly as far as the attitude references are concerned, one could envisage that on the screen appears only a limited part of the straight lines which constitute the reference marks for pitch and roll. One could also simultaneously produce on the screen straight lines or segments of straight lines, which correspond to the roll and pitch angles, and another reference mark having the form of a circle or a quadrilateral of relatively small dimensions centered on the image of the vertical.

The pitch and roll indications can also, but less advantageously, be given by a single reference mark whose coordinates on the frame axis and on the line axis are respectively characteristic of the pitch and roll angles.

What is claimed is:

1. A sighting apparatus for helicopters, comprising: a closed circuit television system including a receiver having a screen, a camera; means for mounting said camera to the lower portion of the helicopter fuselage in such a manner as to furnish on the screen of said receiver an image of a zone located in the vicinity of the helicopter; and further means for the formation, on the image produced on the screen of said receiver, of a first straight line reference mark whose direction remains parallel to one of the axes of said screen and whose position is a function of the pitch angle of the helicopter and of a second straight line reference mark whose direction remains parallel to the other of the axes of said screens and whose position is a function of the roll angle of said helicopter.

2. A sighting apparatus as defined in claim 1, further comprising an orientation mechanism for orienting said camera with respect to the helicopter, said mechanism permitting an orientation of said camera in a direction substantially parallel to the rotor axis of the helicopter, and a displacement of said camera from said direction within a longitudinal plane defined by the rotor axis and the longitudinal axis of the helicopter.

3. A sighting apparatus as defined in claim 1, further comprising means for stabilizing the orientation of the camera in the vertical direction.

4. A sighting apparatus as defined in claim 1, wherein said further means comprises an attitude indicator having a first output which furnishes the helicopter pitch angle in the form of a DC voltage, and a further output which furnishes the helicopter roll angle in the form of a DC voltage, and an auxiliary circiut coupling said outputs to said closed circuit television system for producing electrical signals which generate said first and second reference marks and superimposing said electrical signals onto the signals furnished by said camera.

5. A sighting apparatus as defined in claim 1, further comprising means for the formation of a visual indication of altitude on said receiver screen.

6. A sighting apparatus as defined in claim 1, wherein each of said reference marks is a continuous straight line section, and wherein said reference marks intersect each other.

* * * * *